I. WANTA.
ROLLER SKATE TIRE.
APPLICATION FILED MAY 16, 1908.

905,031.

Patented Nov. 24, 1908.

WITNESSES:
Stephen A. Wanta
Frank B. Garkowski

INVENTOR.
Ignac Wanta

UNITED STATES PATENT OFFICE.

IGNAC WANTA, OF MILWAUKEE, WISCONSIN.

ROLLER-SKATE TIRE.

No. 905,031.  Specification of Letters Patent.  Patented Nov. 24, 1908.

Application filed May 16, 1908. Serial No. 433,260.

*To all whom it may concern:*

Be it known that I, IGNAC WANTA, a citizen of the United States, residing at Milwaukee, in the county of Milwaukee and State of Wisconsin, have invented a new and useful Roller-Skate Tire, of which the following is a specification.

My invention relates to improvements in roller skate wheels, having renewable tires, and the objects of my improvement are, first, to afford facilities for removing and adjusting the tire without taking off the wheel proper, saving time and work; second to provide for a longer wearing wheel, thus cutting down the cost of maintenance of roller skates.

I attain these objects by the apparatus illustrated in the accompanying drawing in which—

Figure 1:
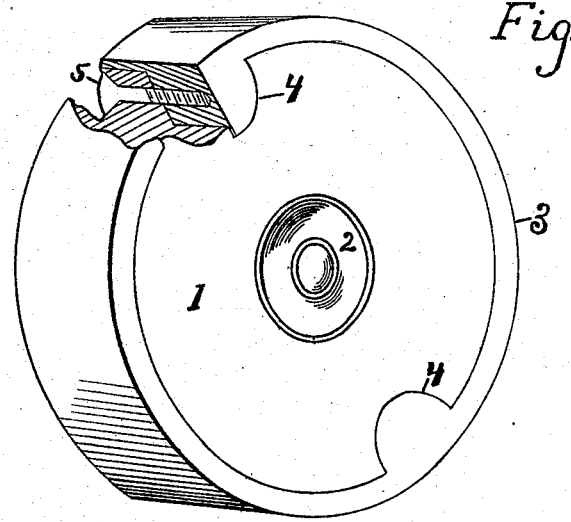
Figure 2:
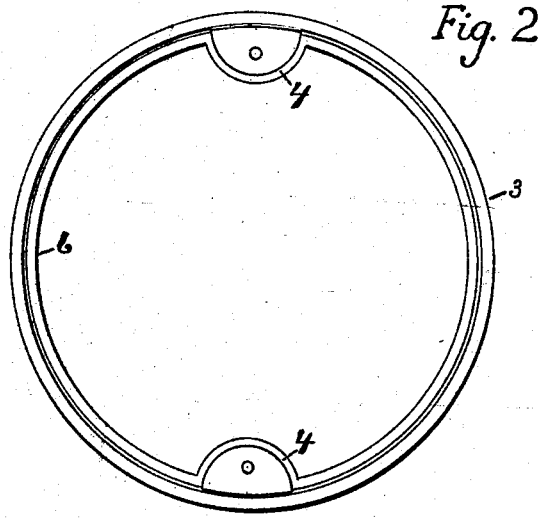
Figure 3:
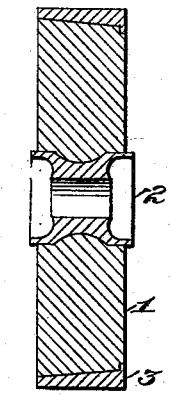

Figure 1, is a perspective view partly in section of the entire wheel. Fig. 2, is a plan of the tire as it appears when it is removed from the wheel. Fig. 3, is a cross section of the wheel in a plane containing the axis.

Similar letters refer to similar parts throughout the several views.

A metal hub 2, and a composition wheel 1, cast onto it constitute the wheel proper. In the wheel 1, are recesses, and holes to accommodate the lugs 4, and flat-head screws 5. The thickness of the tire 3, is uneven or thicker on one edge than the other, so that it can be put on from one side only on the tapered wheel 1, also having a shoulder 6, to prevent its being pulled up too tight on the wheel 1. The holes in the wheel 1, are counterbored to accommodate the screws 5.

I am aware that prior to my invention roller skate wheels with tires have been made; I therefore do not claim such a combination broadly; but

I claim:

The combination in a roller skate tire and wheel, of a metal hub, a composition wheel thereon having its peripheral surface tapered and having two recesses, a metal tapered tire having lugs fitting the recesses, and a shoulder, and flat-head screws entering the lugs, to keep and tighten the tire on the wheel.

IGNAC WANTA.

Witnesses:
 B. JAZDZEWSKI,
 FRANK B. CZARKOWSKI.